US012769935B2

(12) United States Patent
Sethuraman et al.

(10) Patent No.: US 12,769,935 B2
(45) Date of Patent: Oct. 20, 2026

(54) SYSTEM AND METHOD FOR PROACTIVELY REDUCING HALLUCINATIONS IN GENERATIVE ARTIFICIAL INTELLIGENCE (AI) MODEL RESPONSES

(71) Applicant: Microsoft Technology Licensing, LLC, Redmond, WA (US)

(72) Inventors: Prabhakaran Sethuraman, Redmond, WA (US); Srishty Saha, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 152 days.

(21) Appl. No.: 18/508,470

(22) Filed: Nov. 14, 2023

(65) Prior Publication Data

US 2025/0156632 A1 May 15, 2025

(51) Int. Cl.
*G06F 40/20* (2020.01)

(52) U.S. Cl.
CPC .................................. *G06F 40/20* (2020.01)

(58) Field of Classification Search
CPC ................................ G06F 40/00; G06F 40/20
See application file for complete search history.

(56) References Cited

U.S. PATENT DOCUMENTS

2021/0142180 A1* 5/2021 Smith .................... G06N 3/088
2024/0160902 A1* 5/2024 Padgett ................ G06N 3/0895
2025/0021842 A1* 1/2025 Bernstein ................ G06N 5/02
2025/0117645 A1* 4/2025 Zhang .................... G06N 20/00

FOREIGN PATENT DOCUMENTS

CN 116822591 A 9/2023

OTHER PUBLICATIONS

Mishra, A., Soni, U., Arunkumar, A., Huang, J., Kwon, B.C. and Bryan, C., 2023. Promptaid: Prompt exploration, perturbation, testing and iteration using visual analytics for large language models. arXiv preprint arXiv:2304.01964. (Year: 2023).*
Varshney, Neeraj, Wenlin Yao, Hongming Zhang, Jianshu Chen and Dong Yu. "A Stitch in Time Saves Nine: Detecting and Mitigating Hallucinations of LLMs by Validating Low-Confidence Generation." ArXiv abs/2307.03987 (Year: 2023).*
International Search Report and Written Opinion received for PCT Application No. PCT/US2024/052166, mailed on Jan. 17, 2025, 14 pages.

(Continued)

*Primary Examiner* — Sean E Serraguard

(57) ABSTRACT

A method, computer program product, and computing system for processing a prompt for a target generative AI model and a corresponding response generated by the target generative AI model for the prompt. The prompt and the corresponding response from the generative AI model are compared to a plurality of predefined verified prompt-response pairs. In response to determining at least a threshold similarity between the prompt and the corresponding response and a predefined verified prompt-response pair, the corresponding response from the target generative AI model is provided to a source of the prompt.

19 Claims, 6 Drawing Sheets

(56) References Cited

OTHER PUBLICATIONS

Kamalloo, et al., "Evaluating Open-Domain Question Answering in the Era of Large Language Models", arXiv:2305.06984v3, Jul. 6, 2023, 14 pages.
Manakul, et al., "SelfCheckGPT: Zero-Resource Black-Box Hallucination Detection for Generative Large Language Models", arXiv:2303.08896v3, Oct. 11, 2023, 14 pages.
Nigam, et al., "Comparative Analysis of Artificial Intelligence for Indian Legal Question Answering (AILQA) Using Different Retrieval and QA Models", arXiv:2309.14735v1, Sep. 26, 2023, 15 pages.
Xu, et al., "Are We Ready to Embrace Generative AI for Software Q&A?", arXiv:2307.09765v1, Jul. 19, 2023, 5 pages.
International Preliminary Report on Patentability (Chapter I) received for PCT Application No. PCT/US2024/052166, mailed on May 28, 2026, 9 pages.

* cited by examiner

SYSTEM AND METHOD FOR PROACTIVELY REDUCING HALLUCINATIONS IN GENERATIVE ARTIFICIAL INTELLIGENCE (AI) MODEL RESPONSES

BACKGROUND

Generative AI models are being used in customer support service (CSS) and other domains to solve a variety of problems and to ease data processing from various sources to improve the efficiency and accuracy of customer support by automating repetitive and simple tasks and providing consistent responses. However, hallucination in a generative AI model response results in factually incorrect or nonsensical information being presented to a user. Despite advancements in natural language processing, this challenge remains due to the complexity of language understanding and generation. Additionally, current approaches rely on reactive processes to correct hallucinations that have already been provided in a response to a user.

BRIEF DESCRIPTION OF THE DRAWINGS

Like reference symbols in the various drawings indicate like elements.

DETAILED DESCRIPTION OF THE EMBODIMENTS

Figure 1A:
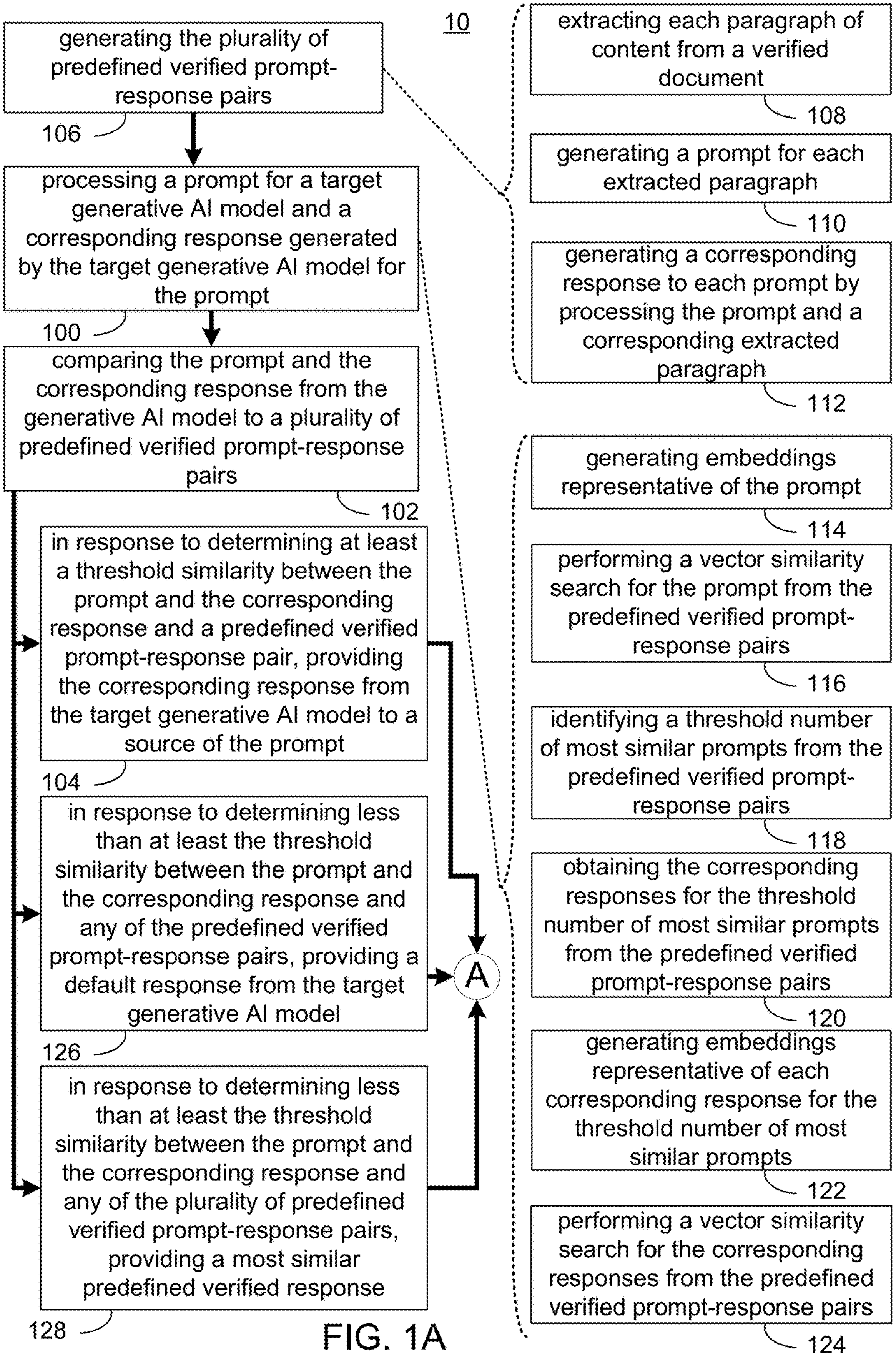
FIGS. 1A-1B are a flow chart of one implementation of a response verification process.
Figure 1B:
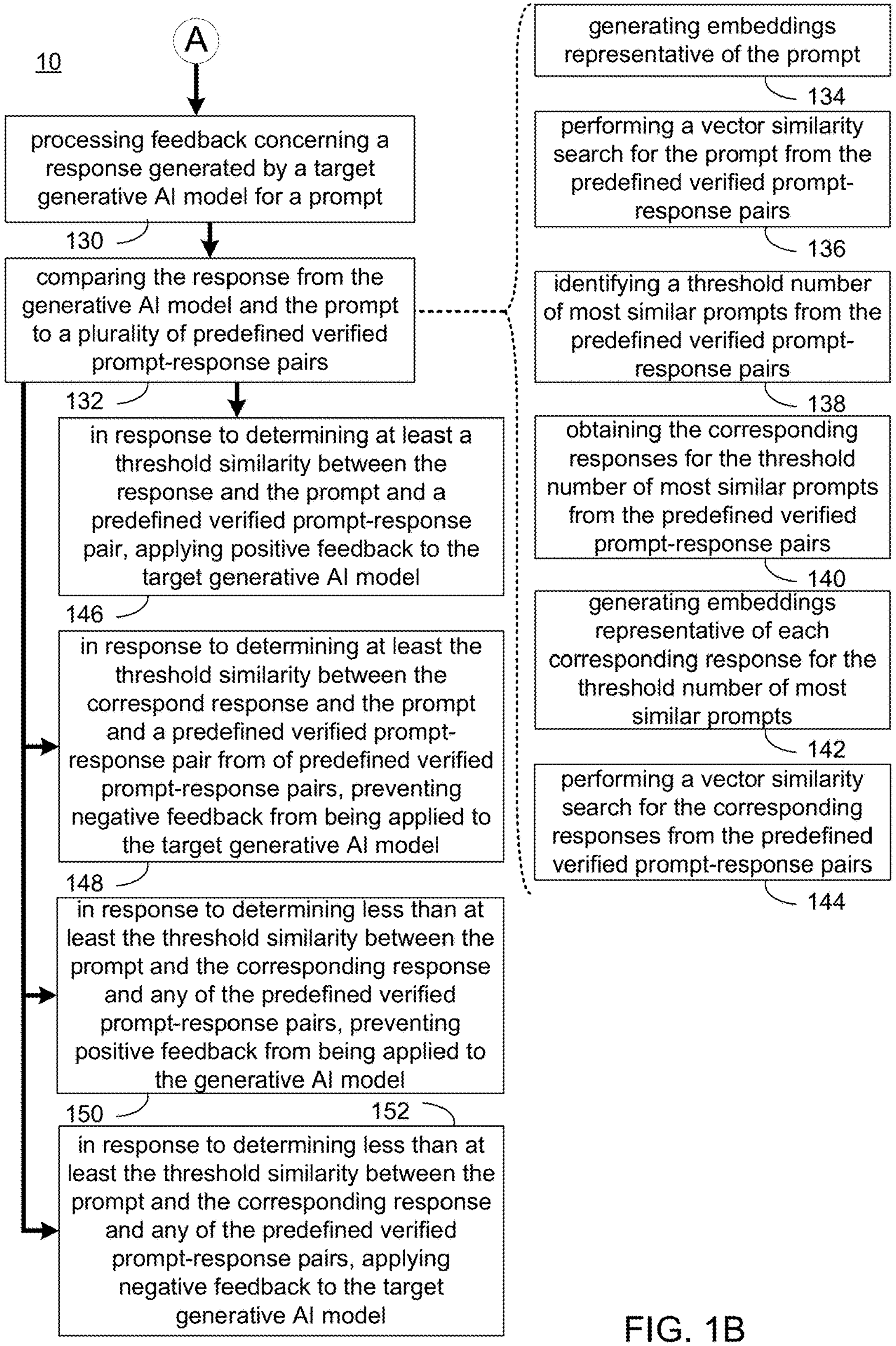

Implementations of the present disclosure provide a two-point comparator model that improves the accuracy of generative AI model responses by proactively reducing hallucinations. For example, generative AI models that include natural language processing (NLP) have advanced in understanding and generating human-like text. However, these generative AI models are not immune to certain challenges, and one such issue is "hallucination." Hallucination refers to the phenomenon where the generative AI model generates responses that contain fictional or incorrect information, without any factual basis in the input data or context. The manifestations of hallucination may vary in severity, ranging from minor factual errors to generating entire passages of imaginative content. In some cases, the generative AI model may confidently present hallucinated information, leading users to believe in the validity of the generated text. This phenomenon can be problematic, especially in critical domains where misinformation may have serious consequences.

To combat hallucination issues, the two-point comparator model of the present disclosure involves a multi-stage process through predefined, verified prompt-response pairs generated by generative AI model(s). As will be discussed in greater detail below, a first stage verifies responses by processing generative AI model responses through predefined verified prompt-responses pairs prior to displaying the response to the user. In this manner, generative AI model responses are verified before being presented to a prompting user and hallucinations are filtered from the response. In a second stage, user feedback is verified by processing through predefined verified prompt-response pairs prior to invoking subject matter experts (SMEs) to verify/correct biased or incorrect user feedback responses. In this manner, user feedback is filtered through predefined verified prompt-response pairs before applying the user feedback to generative AI model training or tuning.

As will be described in greater detail below, implementations of the present disclosure processes a prompt for a target generative AI model and a corresponding response generated by the target generative AI model for the prompt. The prompt and the corresponding response from the generative AI model are compared to a plurality of predefined verified prompt-response pairs. In response to determining at least a threshold similarity between the prompt and the corresponding response and a predefined verified prompt-response pair, the corresponding response from the target generative AI model is provided to a source of the prompt.

As will be described in greater detail below, implementations of the present disclosure provide a process for automatically and proactively identifying and removing hallucinations generated by generative AI models and for improving the accuracy of the responses provided by removing incorrect or factually false information by converting each prompt into a vector of embeddings and each corresponding generative AI model response into a vector embeddings and performing vector similarity between the embedding representations of the prompt and the corresponding response to predefined verified prompt-response pairs. When the vector similarity between the embedding representations of the prompt and the corresponding response and the predefined verified prompt-response pairs is above a threshold, the corresponding response is verified and provided to a source of the prompt. In some implementations, this approach improves the accuracy of generative AI model responses and prevent hallucinations in a manner that is scalable to monitor any number (i.e., millions) of incorrect responses in real-time.

The details of one or more implementations are set forth in the accompanying drawings and the description below. Other features and advantages will become apparent from the description, the drawings, and the claims.

The Response Verification Process:

Referring to FIGS. 1A-4, response verification process 10 processes 100 a prompt for a target generative AI model and a corresponding response generated by the target generative AI model for the prompt. The prompt and the corresponding response from the generative AI model are compared 102 to a plurality of predefined verified prompt-response pairs. In response to determining at least a threshold similarity between the prompt and the corresponding response and a predefined verified prompt-response pair, the corresponding response from the target generative AI model is provided 104 to a source of the prompt.

In some implementations, response verification process 10 proactively reduces hallucinations found in responses generated by generative AI models when processing prompts. For example, AI models use neural networks to identify patterns and structures within a data set to perform a particular task (e.g., convert speech to text, generate new data (e.g., generative AI model), identify a biometric profile within a plurality of biometric profiles, solve complex mathematical problems, etc.). In some implementations, a generative AI model (e.g., generative AI model 200) is configured to receive natural language prompts and/or example entries and/or contextual information concerning a request to generate a response. In some implementations, the AI model includes a Large Language Model (LLM). A LLM (e.g., Bing® Chat from Microsoft®, GPT-4 from OpenAI®, and Bard from Google®) is a language model consisting of a neural network with many parameters (typically billions of weights or more), trained on large quantities of unlabeled text using self-supervised learning or semi-supervised learning. Though trained on simple tasks along the lines of predicting the next word in a sentence, LLMs with sufficient training and parameter counts capture the syntax and semantics of human language. In addition, LLMs demonstrate considerable general knowledge and are able to "memorize" large quantities of facts during training.

However, because LLMs and generative AI models learn patterns from diverse sources that may not include training data that addresses a prompt and/or because a prompt may be incomplete or ambiguous, these models can "hallucinate" responses that may have no direct source. Rather, these hallucinated responses are generated using content from sources that are most likely (e.g., based on probabilities and/or weighting within the generative AI model) to address the prompt. Accordingly, hallucinated responses present significant issues for users who rely on generative AI models to provide factual information (e.g., for safety instructions, for instructions on how to assemble a product, for medical care directions, for information on how to resolve emergency issues, etc.). With response verification process 10, hallucinated responses are identified before, and filtered from, being presented to a source of a prompt. In this manner, response verification process 10 automatically (i.e., without human or manual intervention) and proactively (i.e., in real-time and prior to providing responses to users) prevents hallucinated responses from being provided to a user.

Generating Predefined Verified Prompt-Response Pairs:

In some implementations, response verification process 10 generates 106 the plurality of predefined verified prompt-response pairs by: extracting 108 each paragraph of content from a verified document; generating 110 a prompt for each extracted paragraph using a generative AI model; and generating 112 a corresponding response to each prompt by processing the prompt and a corresponding extracted paragraph using the generative AI model. For example and in some implementations, response verification process 10 uses a plurality of predefined verified prompt-response pairs as a "ground truth" against which prompts and corresponding responses generated by generative AI models are compared to determine whether the response generated by the target generative AI model is a hallucination. Conventional approaches to defining ground truth for a generative AI model include relying on subject matter experts (SMEs) to define or identify facts or other content that describes accurate information. However, this approach cannot scale to rate by which new content is provided to generative AI models. For example, as more content becomes available to generative AI models, the ability to identify ground truth becomes limited by SME processing of that content. As such, response verification process 10 resolves this limitation by using generative AI model(s) to convert content into prompts and corresponding responses that define the ground truth. In this manner, response verification process 10 automates the generation of predefined verified prompt-response pairs using generative AI model(s).

Figure 2:
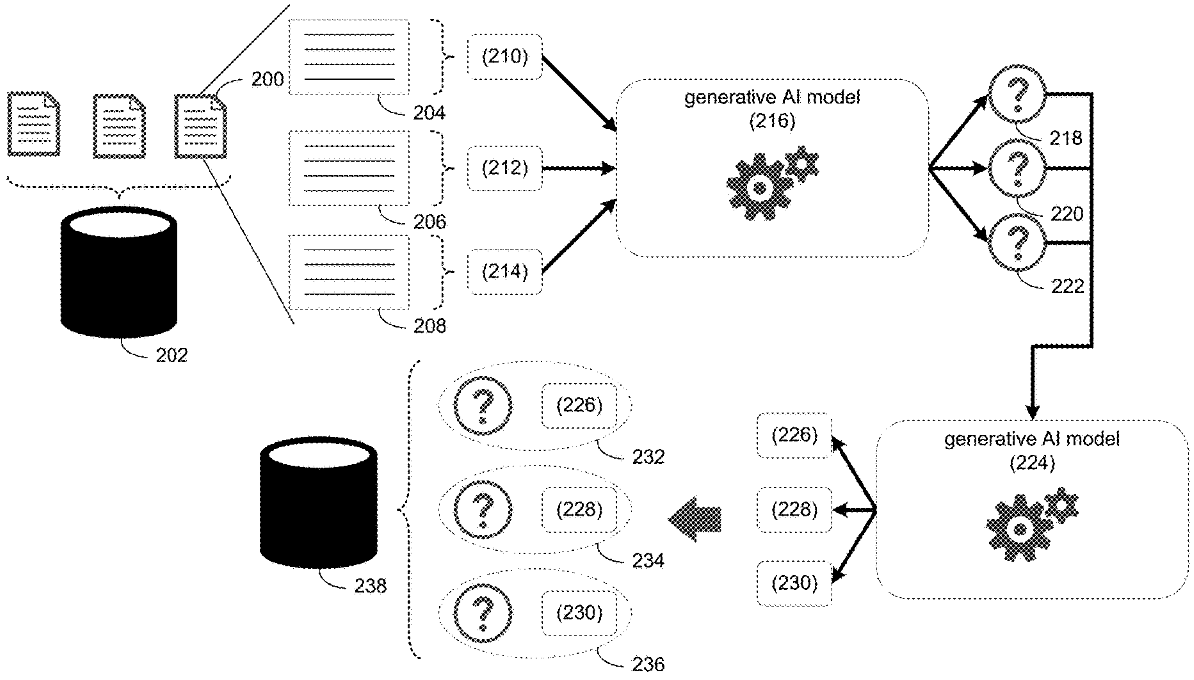
FIG. 2 is a diagrammatic view of the response verification process of FIGS. 1A-1B generating predefined verified prompt-response pairs.

In some implementations, response verification process 10 generates 106 the plurality of predefined verified prompt-response pairs by extracting 108 each paragraph of content from a verified document. Referring also to FIG. 2, response verification process 10 obtains a document (e.g., document 200). In one example, document 200 is a portion of pre-verified content. Pre-verified content generally includes information that has been verified by a subject matter expert (SME) for its accuracy or factual basis. In some implementations, document 200 is stored in a verified content database (e.g., verified content database 202). Response verification process 10 extracts 108 each paragraph of content (e.g., paragraphs 204, 206, 208) and generates unique identifiers for each document and each paragraph (e.g., document and paragraph identifiers 210, 212, 214). In some implementations, extracting 108 each paragraph includes performing data cleaning. In one example, data cleaning includes using natural language processing (NLP) techniques to clean irrelevant punctuation marks, characters, and to fix formatting issues. In another example, data cleaning does not include performing lemmatization or stemming on documents to avoid contextual information loss. In some implementations, paragraph-level extraction is particularly useful for generative AI models and information retrieval systems when the answers require more extensive context, and single-sentence answers may be insufficient. By selecting entire paragraphs, response verification process 10 can provide more comprehensive and coherent responses to user prompts, leading to a better user experience and more informative interaction. In one example, paragraph level extraction is performed by parsing breaks (e.g., "\n") or specific tags (e.g., <p>) in HTML documents. Each extracted paragraph is denoted with a paragraph identifier (e.g., "Para-Id") and it is saved along with an associated a document identifier (e.g., "Doc-Id"). In some implementations, content of each paragraph is vectorized through a word embedding model. Accordingly, each extracted paragraph may be defined as a vector of Para-Id, Paragraph Content, Doc-Id, Para-Embeddings.

In some implementations, response verification process 10 generates 110 a prompt for each extracted paragraph using a generative AI model. For example, response verification process 10 provides each paragraph (e.g., paragraphs 204, 206, 208) to a generative AI model (e.g., generative AI model 216) such as T5 (text-to-text transfer), BART (bi-directional auto transformer model) or a Davinci model to generate questions/prompts (e.g., prompts 218, 220, 222). In some implementations, each generated question/prompt is stored along with their document identifier and their paragraph identifier. In one example, response verification process 10 generates a vector or other identifier formed from the combination of a prompt identifier, a document identifier, and a paragraph identifier (e.g., Ques ID, Doc ID, Para ID). In some implementations and as will be described below, each prompt (e.g., prompts 218, 220, 222) is vectorized as embeddings that are used to search answers/responses from paragraphs through vector similarity metrics.

In some implementations, response verification process 10 generates 112 a corresponding response to each prompt by processing the prompt and a corresponding extracted paragraph. For example, response verification process 10 provides the prompts (e.g., prompts 218, 220, 222) along with their content (e.g., by paragraph identifier and document identifier) to a generative AI model (e.g., generative AI model 224) to generate prompts. In one example, generative AI model 224 is the same as generative AI model 216 used to generate prompts 218, 220, 222. In another example, generative AI model 224 is a different generative AI model than generative AI model 216. Using generative AI model 224, response verification process 10 generates a corresponding response (e.g., corresponding responses 226, 228, 230) for prompts 218, 220, 222.

In some implementations and for each prompt, response verification process 10 performs a vector similarity search on each prompt embedding and paragraph embedding. In some implementations, this results in fetching a "top N" answers/responses signifying ranking of the paragraphs based on relevance to the question/prompt. The fetched top paragraph embeddings indicate the lines in the paragraph which are relevant to construct the answers/responses. In one example, response verification process 10 performs vector similarity metrics to fetch top answers/responses 226, 228, 230 for prompts 218, 220, 222. Accordingly, response verification process 10 controls the quality of responses 226, 228, 230 by adding a threshold on the similarity score such that if similarity score is greater than threshold value, then response verification process 10 only saves that answer in the plurality of predefined verified prompt-response pairs. In one example, the threshold for the similarity score is high enough to achieve high accuracy for generated answers/responses. In this example, other parameters such as temperature and top probability are set to "0" and "1", respectively. In this manner, response verification process 10 generates a plurality of predefined verified prompt-response pairs (e.g., predefined verified prompt-response pairs 232, 234, 236). In one example, predefined verified prompt-response pairs 232, 234, 236 are stored in a database of predefined verified prompt-response pairs (e.g., predefined verified prompt-response pair database 238). In some implementations, predefined verified prompt-response pair database 238 includes a plurality of predefined verified prompt-response pairs in the following format: (Ques-Id, Question, Question Embeddings, Ans-Id, Answers, Answer Embeddings, Para-Id, Doc-Id). As will be discussed in greater detail below, the plurality of predefined verified prompt-response pairs are generated automatically without human intervention and can be used to proactively identify and remove hallucinated responses from being provided to users.

Figure 3:
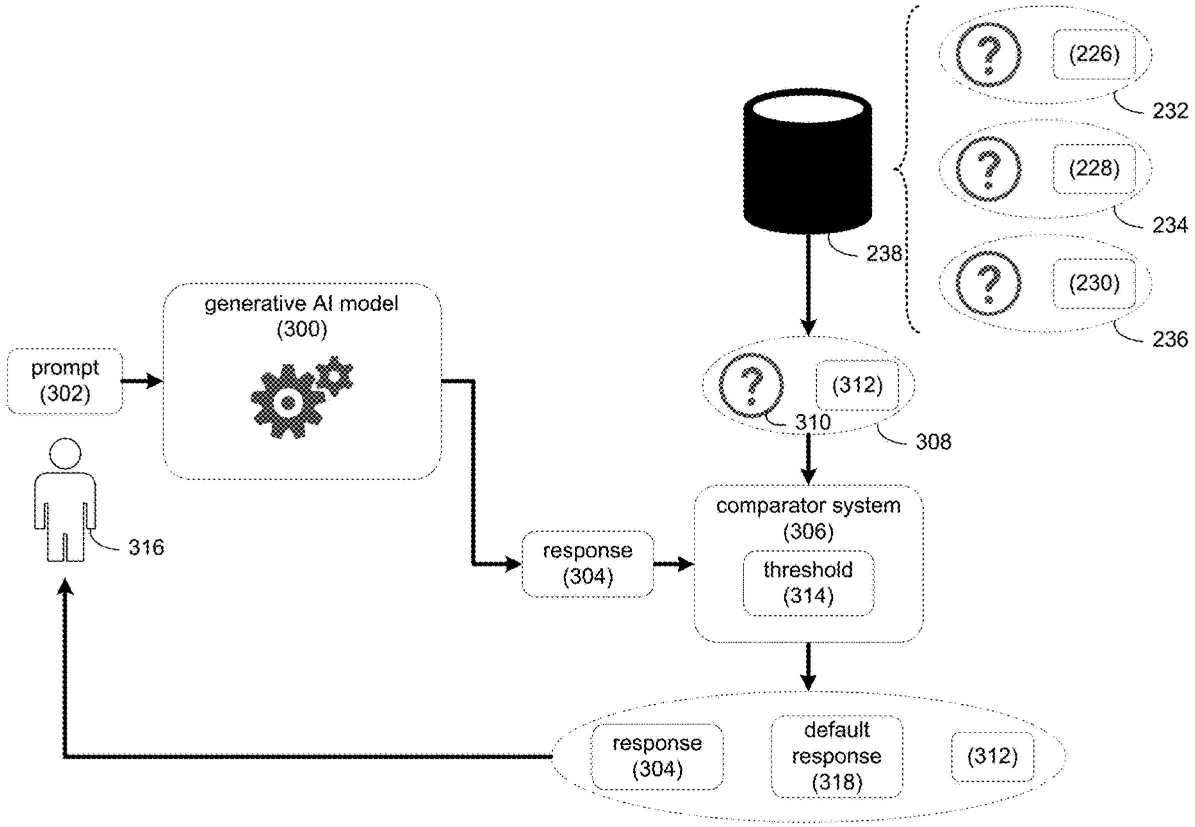
FIG. 3 is a diagrammatic view of the response verification process of FIGS. 1A-1B verifying generative AI model responses.

Generative AI Model Response Verification:

In some implementations, response verification process 10 processes 100 a prompt for a target generative AI model and a corresponding response generated by the target generative AI model for the prompt. For example, response verification process 10 provides a proactive approach for verifying generative AI model responses for hallucinations in real-time by comparing a response generated by a target generative AI model against a plurality of predefined verified prompt-response pairs as described above. Referring also to FIG. 3, a target generative AI model (e.g., target generative AI model 300) is the generative AI model that a user (or other source) provides with a prompt in order to obtain a response. In this manner, target generative AI model 300 is the generative AI model that response verification process 10 interacts with to identify and restrict hallucinated responses from. In some implementations, target generative AI model 300 processes a prompt (e.g., prompt 302) to generate a corresponding response (e.g., corresponding response 304).

In some implementations, response verification process 10 compares 102 the prompt and the corresponding response from the generative AI model to a plurality of predefined verified prompt-response pairs. As discussed above, a predefined verified prompt-response pair is a combination of prompts/questions and generative AI model responses/answers that are verified by a SME and/or by response verification process 10 as described above. In this manner, predefined verified prompt-response pairs represent ground truth that can validate or verify responses generated by the target generative AI model. Referring again to FIG. 3 and in some implementations, response verification process 10 provides prompt 302 and corresponding response 304 to a comparator system (e.g., comparator system 306). Comparator system 306 is a hardware and/or software component that processes prompt 302 and corresponding response 304 and compares 402 the combination of prompt 300 and corresponding response 304 to a plurality of predefined verified prompt-response pairs (e.g., predefined verified prompt-response pairs 232, 234, 236). In some implementations, comparator system 306 is also referred to as a "content moderator" or "data tuner" as response verification process 10 is able to provide data enrichment In some implementations, comparing 102 the prompt and the corresponding response from the generative AI model to a plurality of predefined verified prompt-response pairs includes generating 114 embeddings representative of the prompt. For example, an embedding or a vector embedding is a way to convert words and sentences and other data into numbers that capture their meaning and relationships. They represent different data types as points in a multidimensional space, where similar data points are clustered closer together. These numerical representations help machines understand and process this data more effectively. In some implementations, response verification process 10 generates 114 a vector embedding representative of prompt 302. In one example, response verification process 10 generates 114 the vector embedding for prompt 302 using comparator system 306. In another example, response verification process 10 generates 114 the vector embedding for prompt 302 using a separate system/embedding system.

In some implementations, response verification process 10 performs 116 a vector similarity search for the prompt from the plurality of predefined verified prompt-response pairs using the embeddings representative of the prompt. For example, a vector similarity search includes identifying similar data using approximate nearing neighbor (ANN) algorithms. Compared to a traditional keyword search, vector search yields more relevant results and executes faster. In some implementations, response verification process 10 identifies 118 a threshold number of most similar prompts from the plurality of predefined verified prompt-response pairs. Referring again to FIG. 3, when performing 116 a vector similarity search for prompt 302, response verification process 10 identifies 118 a threshold number of most similar prompts (i.e., the top "N" most similar prompts) from a plurality of predefined verified prompt-response pairs (e.g., predefined verified prompt-response pairs 232, 234, 236). In one example, the threshold number is a default number (e.g., three). In another example, the threshold number is a user-defined value. In some implementations, "most similar" prompt is defined as a threshold level of similarity when performing vector similarity searching. This threshold may be a default value or a user-defined value.

As shown in FIG. 3, in response to performing 116 a vector similarity search for prompt 302 from predefined verified prompt-response pairs 232, 234, 236, response verification process 10 identifies 118 a threshold number of most similar prompts (e.g., predefined verified prompt-response pair 308 with prompt 310). In this example, prompt 310 is the most similar prompt of predefined verified prompt-response pairs 232, 234, 236 when compared with prompt 302. In some implementations, if there is not a sufficiently similar prompt in the plurality of predefined verified prompt-response pairs, response verification process 10 may alert (e.g., by providing a pop up window or other electronic message) a source of prompt 302 that response verification process 10 is unable to perform hallucination prevention based on prompt 302. In some implementations, a source of prompt 302 can selectively enable (i.e., choose when to enable and when to disable) response verification process 10 from performing verification of responses from a target generative AI model. In this manner, users are able to determine when they need hallucination-free responses and when they are searching for creative content (i.e., content not based on verified information).

In some implementations, response verification process 10 obtains 120 the corresponding responses for the threshold number of most similar prompts from the plurality of predefined verified prompt-response pairs. For example, with the most similar prompts (e.g., prompt 310), response verification process 10 obtains 120 the corresponding responses (e.g., corresponding response 312). In some implementations, response verification process 10 generates 122 embeddings representative of each corresponding response for the threshold number of most similar prompts. As with prompt 302, response verification process 10 generates 122 embeddings representative of corresponding response 304 by converting the words and sentences and other data of corresponding response 304 into numbers that capture their meaning and relationships.

In some implementations, response verification process 10 performs 124 a vector similarity search for the corresponding responses from the plurality of predefined verified prompt-response pairs using the embeddings representative of the prompt. For example, response verification process 10 compares the embedding representation of response 304 generated by target generative AI model 300 and the corresponding responses from the plurality of predefined verified prompt-response pairs (e.g., corresponding response 312). In some implementations, response verification process 10 uses a threshold level of similarity (e.g., threshold 314) to determine whether response 304 is sufficiently similar to a corresponding response from the plurality of predefined verified prompt-response pairs (e.g., corresponding response 312). When response 304 is not sufficiently similar (i.e., the level of similarity is below threshold 314), response 304 is indicative of a hallucination because it cannot be verified with a corresponding response from a sufficiently similar prompt of the plurality of predefined verified prompt-response pairs. When response 304 is sufficiently similar (i.e., the level of similarity is at or above threshold 314), response 304 is indicative of verified response because it can be verified with a corresponding response from a sufficiently similar prompt of the plurality of predefined verified prompt-response pairs.

In some implementations and in response to determining at least a threshold similarity between the prompt and the corresponding response and a predefined verified prompt-response pair, response verification process 10 provides 104 the corresponding response from the target generative AI model to a source of the prompt. For example, suppose that response verification process 10 determines that there is at least a threshold similarity (i.e., the comparison of response 304 to a corresponding response from the plurality of predefined verified prompt-response pairs (e.g., corresponding response 312)). In this example, response verification process 10 indicates that response 304 is not a hallucination because response 304 is verified relative to corresponding response 312 from the plurality of predefined verified prompt-response pairs. Accordingly, response verification process 10 provides 104 response 304 generated by target generative AI model 300 to a source of the prompt (e.g., user 316). In one example, providing 104 response 304 to the source of prompt 302 includes directing or permitting generative AI model 300 to reply to prompt 302 with response 304. In another example, providing 104 response 304 to the source of prompt 302 includes providing response 304 using comparator system 306 or another hardware/software component that interacts with generative AI model 300. In some implementations when providing 104 response 304 to the source of prompt 302, response verification process 10 provides a notice that response 304 has been processed for possible hallucinations. In this manner, a source of prompt 302 may have greater confidence that response 304 is based on verified information.

In some implementations and in response to determining less than at least the threshold similarity between the prompt and the corresponding response and any of the plurality of predefined verified prompt-response pairs, response verification process 10 provides 126 a default response from the target generative AI model. For example, suppose that response verification process 10 determines that there is not at least a threshold similarity (i.e., the comparison of response 304 to a corresponding response from the plurality of predefined verified prompt-response pairs (e.g., corresponding response 312)). In this example, response verification process 10 indicates that response 304 may be a hallucination because response 304 is not verified relative to the plurality of predefined verified prompt-response pairs. In some instances, response verification process 10 provides a default response (e.g., default response 318) to a source of the prompt (e.g., user 316). For example, default response 318 includes a notice that response 304 has been processed for possible hallucinations and that response 304 cannot be verified relative to a ground truth database. In this manner, a source of prompt 302 may have an understanding that response 304 is not based on verified information. In another example, default response 318 includes a request for the source of prompt 302 to provide a new prompt or to access particular sources of information to assist the source in obtaining verified information.

In some implementations and in response to determining less than at least the threshold similarity between the prompt and the corresponding response and any of the plurality of predefined verified prompt-response pairs, response verification process 10 provides 128 a most similar predefined verified response from the plurality of predefined verified prompt-response pairs. For example, suppose that response verification process 10 determines that there is not at least a threshold similarity (i.e., the comparison of response 304 to a corresponding response from the plurality of predefined verified prompt-response pairs (e.g., corresponding response 312)). In this example, response verification process 10 indicates that response 304 may be a hallucination because response 304 is not verified relative to the plurality of predefined verified prompt-response pairs. In some instances, response verification process 10 provides a most similar predefined verified response (e.g., corresponding response 312) from the plurality of predefined verified prompt-response pairs to a source of the prompt (e.g., user 316). For example, response verification process 10 provides 128 most similar predefined verified response 312 and a notice that the initially-generated response 304 has been processed for possible hallucinations and that response 304 cannot be verified relative to a ground truth database but that response 312 represents the most similar response that is based on verified information. In this manner, a source of prompt 302 be provided with verified information even if it is not as relevant to prompt 302.

User Feedback Response Verification:

In some implementations and in response to providing the corresponding response from the target generative AI model to the source of the prompt, response verification process 10 processes 130 feedback concerning the corresponding response. For example and referring also to FIG. 4, suppose a source of prompt 302 (e.g., user 316) provides prompt 302 to a generative AI model (e.g., generative AI model 300) and response verification process 10 provides either a verified response (e.g., response 304), a default response (e.g., default response 318), or a most similar verified response (e.g., response 312). When the source of prompt 302 receives the response, response verification process 10 solicits and/or accepts feedback (e.g., feedback 400) concerning the response (e.g., response 304). In one example, feedback 400 is sentiment feedback (i.e., a selection of a positive response or a negative response; or a selection of a "like" or a "dislike"). In another example, feedback 400 is a user assertion of the accuracy of response 304 (i.e., a selection of a user-based verification as "verified"/"accurate"/"true", or "unverified"/"inaccurate"/"false"). However, as user-feedback may be inaccurate or vulnerable to biases, response verification process 10 processes 130 feedback 400 concerning a generative AI model response (e.g., response 304 from generative AI model 300) to determine whether feedback 400 should be applied to subsequent training of generative AI model 300.

In some implementations, processing 130 the feedback includes determining that the feedback is one of positive feedback and negative feedback. For example, positive feedback is feedback that supports the accuracy or truthfulness of response 304 generated by generative AI model 300 and negative feedback is feedback that opposes the accuracy or truthfulness of response 304 generated by generative AI model 300. In some implementations, feedback 400 that is a "like" is positive feedback while a "dislike" is negative feedback.

In some implementations, response verification process 10 compares 132 the prompt and the corresponding response from the generative AI model to the plurality of predefined verified prompt-response pairs. For example and as discussed above, a predefined verified prompt-response pair is a combination of prompts/questions and generative AI model responses/answers that are verified by a SME and/or by response verification process 10 as described above. In this manner, predefined verified prompt-response pairs represent ground truth that can validate or verify responses generated by the target generative AI model. In some implementations, response verification process 10 provides prompt 302, corresponding response 304, and feedback 400 to a comparator system (e.g., comparator system 306). Comparator system 306 is a hardware and/or software component that processes prompt 302, corresponding response 304, and feedback 400 and compares 132 the combination of prompt 302, corresponding response 304, and feedback 400 to a plurality of predefined verified prompt-response pairs (e.g., predefined verified prompt-response pairs 232, 234, 236) to determine whether feedback 400 is applied to subsequent training of generative AI model 300 and/or to flag inaccurate user feedback.

In some implementations, comparing 132 the prompt and the response to the plurality of predefined verified prompt-response pairs includes generating 134 embeddings representative of the prompt. For example and as described above, an embedding or a vector embedding is a way to convert words and sentences and other data into numbers that capture their meaning and relationships. In some implementations, response verification process 10 generates 134 a vector embedding representative of prompt 302. In one example, response verification process 10 generates 134 the vector embedding for prompt 302 using comparator system 306. In another example, response verification process 10 generates 134 the vector embedding for prompt 302 using a separate system/embedding system.

In some implementations, response verification process 10 performs 136 a vector similarity search for the prompt from the plurality of predefined verified prompt-response pairs using the embeddings representative of the prompt. For example and as described above, a vector similarity search includes identifying similar data using approximate nearing neighbor (ANN) algorithms. In some implementations, response verification process 10 identifies 138 a threshold number of most similar prompts from the plurality of predefined verified prompt-response pairs. Referring again to FIG. 4, when performing 136 a vector similarity search for prompt 302, response verification process 10 identifies 138 a threshold number of most similar prompts (i.e., the top "N" most similar prompts) from a plurality of predefined verified prompt-response pairs (e.g., predefined verified prompt-response pairs 232, 234, 236). In one example, the threshold number is a default number (e.g., three). In another example, the threshold number is a user-defined value. In some implementations, "most similar" prompt is defined as a threshold level of similarity when performing vector similarity searching. This threshold may be a default value or a user-defined value.

Figure 4:
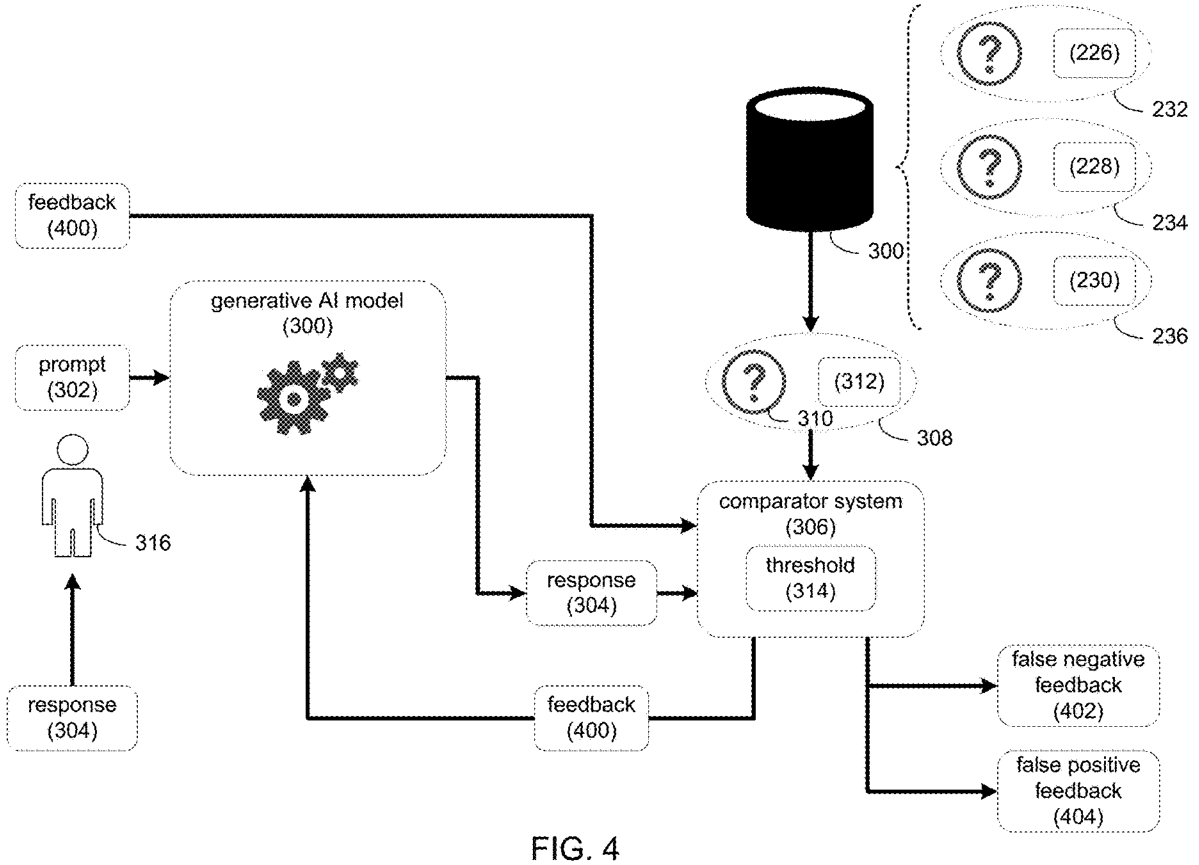
FIG. 4 is a diagrammatic view of the response verification process of FIGS. 1A-1B verifying user feedback concerning generative AI model responses.

As shown in FIG. 4, in response to performing 136 a vector similarity search for prompt 302 from predefined verified prompt-response pairs 232, 234, 236, response verification process 10 identifies 138 a threshold number of most similar prompts (e.g., predefined verified prompt-response pair 308 with prompt 310). In this example, prompt 310 is the most similar prompt of predefined verified prompt-response pairs 232, 234, 236 when compared with prompt 302. In some implementations, if there is not a sufficiently similar prompt in the plurality of predefined verified prompt-response pairs, response verification process 10 may alert (e.g., by providing a pop up window or other electronic message) a source of prompt 302 that response verification process 10 is unable to perform hallucination prevention based on prompt 302.

In some implementations, response verification process 10 identifies 138 a threshold number of most similar prompts from the plurality of predefined verified prompt-response pairs. In this example, prompt 310 is the most similar prompt of predefined verified prompt-response pairs 232, 234, 236 when compared with prompt 302. In some implementations, if there is not a sufficiently similar prompt in the plurality of predefined verified prompt-response pairs, response verification process 10 may alert (e.g., by providing a pop up window or other electronic message) a source of prompt 302 that response verification process 10 is unable to perform feedback verification based on prompt 302 and response 304.

In some implementations, response verification process 10 obtains 140 the corresponding responses for the threshold number of most similar prompts from the plurality of predefined verified prompt-response pairs. For example, with the most similar prompts (e.g., prompt 310), response verification process 10 obtains the corresponding responses (e.g., corresponding response 312). In some implementations, response verification process 10 generates 142 embeddings representative of each corresponding response for the threshold number of most similar prompts. As with prompt 302, response verification process 10 generates 142 embeddings representative of each corresponding response for the threshold number of most similar prompts by converting the words and sentences and other data of corresponding response 304 into numbers that capture their meaning and relationships.

In some implementations, response verification process 10 performs 144 a vector similarity search for the corresponding responses from the plurality of predefined verified prompt-response pairs using the embeddings representative of the prompt. For example, response verification process 10 compares the embedding representation of response 304 generated by target generative AI model 300 and the corresponding responses from the plurality of predefined verified prompt-response pairs (e.g., corresponding response 312). In some implementations, response verification process 10 uses a threshold level of similarity (e.g., threshold 314) to determine whether response 304 is sufficiently similar to a corresponding response from the plurality of predefined verified prompt-response pairs (e.g., corresponding response 312). When response 304 is not sufficiently similar (i.e., the level of similarity is below threshold 312), response 304 is indicative of a hallucination because it cannot be verified with a corresponding response from a sufficiently similar prompt of the plurality of predefined verified prompt-response pairs. When response 304 is sufficiently similar (i.e., the level of similarity is at or above threshold 312), response 304 is indicative of verified response because it can be verified with a corresponding response from a sufficiently similar prompt of the plurality of predefined verified prompt-response pairs.

In some implementations and in response to determining at least a threshold similarity between the prompt and the corresponding response and a predefined verified prompt-response pair, response verification process 10 applies 146 positive feedback to the target generative AI model. For example, suppose that response verification process 10 determines that there is at least a threshold similarity (i.e., the comparison of response 304 to a corresponding response from the plurality of predefined verified prompt-response pairs (e.g., corresponding response 312)). In this example, response verification process 10 indicates that response 304 is not a hallucination because response 304 is verified relative to corresponding response 312 from the plurality of predefined verified prompt-response pairs. Accordingly, the content of response 304 is accurate or truthful as determined by the ground truth database formed from the plurality of predefined verified prompt-response pairs. In some implementations, with response 304 being verified by response verification process 10, feedback 400 should ideally be positive (i.e., indicating that the user confirms the information to be accurate or truthful). In one example, suppose that a user (e.g., user 316) provides positive feedback 400 concerning response 304. Further suppose that response verification process 10 determines that response 304 is verified by prompt-response pair 308. Accordingly, because feedback 400 is positive and response verification process 10 determines that response 304 is verified, response verification process 10 applies 146 feedback 400 to generative AI model 300. In some implementations, applying 146 feedback 400 to generative AI model 300 includes using feedback 400 in subsequent training or tuning of generative AI model 300. For example, during training or tuning of generative AI model 300, positive feedback 400 is used to improve the likelihood that generative AI model 300 generates response 304 for prompts similar to prompt 302.

In some implementations and in response to determining at least the threshold similarity between the prompt and the corresponding response and a predefined verified prompt-response pair, response verification process 10 prevents 148 negative feedback from being applied to the generative AI model. For example, suppose that response verification process 10 determines that there is not at least a threshold similarity (i.e., the comparison of response 304 to a corresponding response from the plurality of predefined verified prompt-response pairs (e.g., corresponding response 312)). In this example, response verification process 10 indicates that response 304 is a hallucination because response 304 is not verified relative to corresponding response 312 from the plurality of predefined verified prompt-response pairs. Accordingly, the content of response 304 is accurate or truthful as determined by the ground truth database formed from the plurality of predefined verified prompt-response pairs. In some implementations, with response 304 being verified by response verification process 10, feedback 400 should ideally be positive (i.e., indicating that the user confirms the information to be accurate or truthful). In one example, suppose that a user (e.g., user 316) provides negative feedback 400 concerning response 312. Further suppose that response verification process 10 determines that response 304 is verified by prompt-response pair 308. Accordingly, because feedback 400 is negative and response verification process 10 determines that response 304 is verified, response verification process 10 prevents 148 feedback 400 from being applied to generative AI model 300. In one example, preventing 148 feedback 400 from being applied to generative AI model 300 includes deleting feedback 400 from response verification process 10. In this manner, response verification process 10 identifies false negative feedback (e.g., false negative feedback 402) and prevents 148 false negative feedback 402 from being applied to generative AI model 300.

In some implementations and in response to determining less than at least the threshold similarity between the prompt and the corresponding response and any of the plurality of predefined verified prompt-response pairs, response verification process 10 prevents 150 positive feedback from being applied to the generative AI model. For example, suppose that response verification process 10 determines that there is not at least a threshold similarity (i.e., the comparison of response 304 to a corresponding response from the plurality of predefined verified prompt-response pairs (e.g., corresponding response 312)). In this example, response verification process 10 indicates that response 304 is not verified relative to any responses from the plurality of predefined verified prompt-response pairs. Accordingly, the content of response 304 is inaccurate or false as determined by the ground truth database formed from the plurality of predefined verified prompt-response pairs. In some implementations, with response 304 not being verified by response verification process 10, feedback 400 should ideally be negative (i.e., indicating that the user confirms the information to be inaccurate or false). In one example, suppose that a user (e.g., user 316) provides positive feedback 400 concerning response 304. Further suppose that response verification process 10 determines that response 304 is not verified by prompt-response pair 308. Accordingly, because feedback 400 is positive and response verification process 10 determines that response 304 is not verified, response verification process 10 prevents 150 feedback 400 from being applied to generative AI model 300. In this manner, response verification process 10 identifies false positive feedback (e.g., false positive feedback 404) and prevents 150 false positive feedback 404 from being applied to generative AI model 300.

In some implementations and in response to determining less than at least the threshold similarity between the prompt and the corresponding response and any of the plurality of predefined verified prompt-response pairs, response verification process 10 applies 152 negative feedback to the target generative AI model. For example, suppose that response verification process 10 determines that there is not at least a threshold similarity (i.e., the comparison of response 304 to a corresponding response from the plurality of predefined verified prompt-response pairs (e.g., corresponding response 312)). In this example, response verification process 10 indicates that response 304 is not verified relative to any responses from the plurality of predefined verified prompt-response pairs. Accordingly, the content of response 304 is inaccurate or false as determined by the ground truth database formed from the plurality of predefined verified prompt-response pairs. In some implementations, with response 304 not being verified by response verification process 10, feedback 400 should ideally be negative (i.e., indicating that the user confirms the information to be inaccurate or false). In one example, suppose that a user (e.g., user 316) provides negative feedback 400 concerning response 304. Further suppose that response verification process 10 determines that response 304 is not verified by prompt-response pair 308. Accordingly, because feedback 400 is negative and response verification process 10 determines that response 304 is not verified, response verification process 10 applies 152 feedback 400 to generative AI model 300. In this manner, response verification process 10 applies 152 feedback 400 to generative AI model 300 to help train or tune generative AI model 300 to not generate response 304 for future prompts that are similar to prompt 302.

Figure 5:
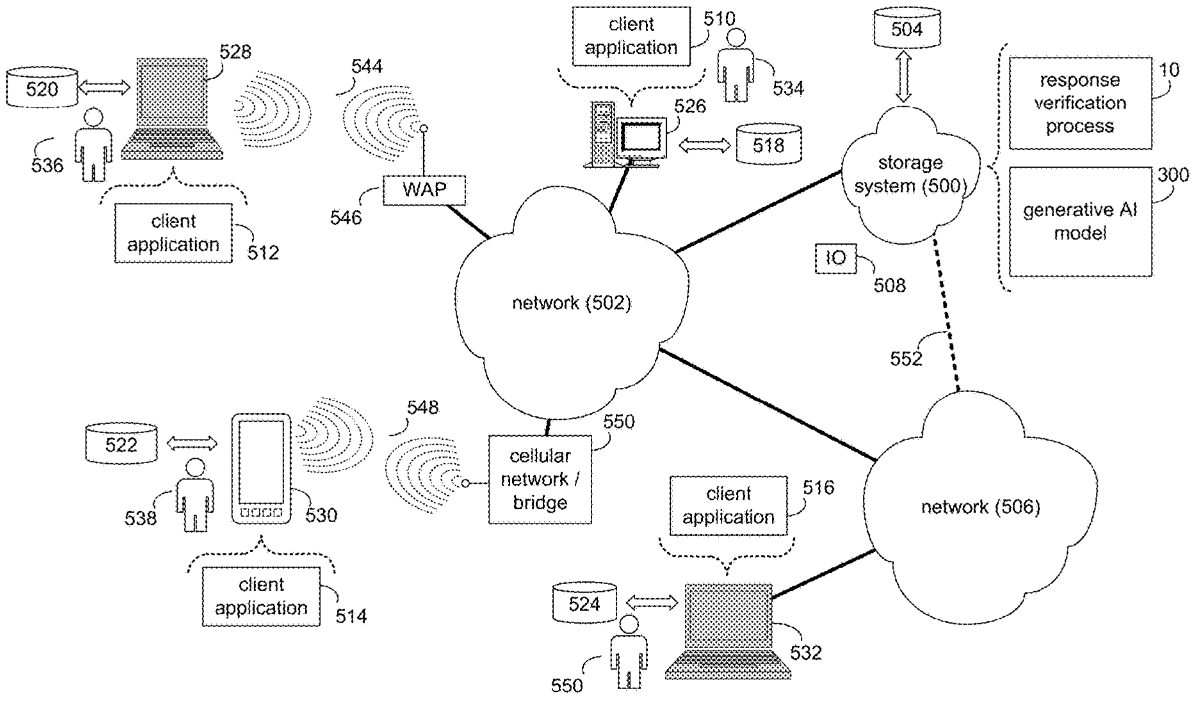
FIG. 5 is a diagrammatic view of computer system and the response verification process coupled to a distributed computing network.

System Overview:

Referring to FIG. 5, a response verification process 10 is shown to reside on and is executed by storage system 500, which is connected to network 502 (e.g., the Internet or a local area network). Examples of storage system 500 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of storage system 500 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of response verification process 10, which are stored on storage device 504 included within storage system 500, are executed by one or more processors (not shown) and one or more memory architectures (not shown) included within storage system 500. Storage device 504 may include: a hard disk drive; an optical drive; a RAID device; a random-access memory (RAM); a read-only memory (ROM); and all forms of flash memory storage devices. Additionally or alternatively, some portions of the instruction sets and subroutines of response verification process 10 are stored on storage devices (and/or executed by processors and memory architectures) that are external to storage system 500. In some implementations, network 502 is connected to one or more secondary networks (e.g., network 506), examples of which include: a local area network; a wide area network; or an intranet.

Various input/output (IO) requests (e.g., IO request 508) are sent from client applications 510, 512, 514, 516 to storage system 500. Examples of IO request 508 include data write requests (e.g., a request that content be written to storage system 500) and data read requests (e.g., a request that content be read from storage system 500).

The instruction sets and subroutines of client applications 510, 512, 514, 516, which may be stored on storage devices 518, 520, 522, 524 (respectively) coupled to client electronic devices 526, 528, 530, 532 (respectively), may be executed by one or more processors (not shown) and one or more memory architectures (not shown) incorporated into client electronic devices 526, 528, 530, 532 (respectively). Storage devices 518, 520, 522, 524 may include: hard disk drives; tape drives; optical drives; RAID devices; random access memories (RAM); read-only memories (ROM), and all forms of flash memory storage devices. Examples of client electronic devices 526, 528, 530, 532 include personal computer 526, laptop computer 528, smartphone 530, laptop computer 532, a server (not shown), a data-enabled, and a dedicated network device (not shown). Client electronic devices 526, 528, 530, 532 each execute an operating system.

Users 534, 536, 538, 540 may access storage system 500 directly through network 502 or through secondary network 506. Further, storage system 500 may be connected to network 502 through secondary network 506, as illustrated with link line 542.

The various client electronic devices may be directly or indirectly coupled to network 502 (or network 506). For example, personal computer 526 is shown directly coupled to network 502 via a hardwired network connection. Further, laptop computer 532 is shown directly coupled to network 506 via a hardwired network connection. Laptop computer 528 is shown wirelessly coupled to network 502 via wireless communication channel 544 established between laptop computer 528 and wireless access point (e.g., WAP) 546, which is shown directly coupled to network 502. WAP 546 may be, for example, an IEEE 802.11a, 802.11b, 802.11g, 802.11n, Wi-Fi®, and/or Bluetooth® device that is capable of establishing a wireless communication channel 544 between laptop computer 528 and WAP 546. Smartphone 530 is shown wirelessly coupled to network 502 via wireless communication channel 548 established between smartphone 530 and cellular network/bridge 550, which is shown directly coupled to network 502.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a “circuit,” “module” or “system.” Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

generating a first embedding representing a prompt directed to a target generative artificial intelligence (AI) model and a second embedding representing a corresponding response generated by target generative AI model based on the prompt;

performing a vector similarity search on the first embedding and the second embedding with respect to embeddings representing prompts and responses of a plurality of predefined verified prompt-response pairs; and in response to determining, based on the vector similarity search, at least a threshold similarity between the prompt and the corresponding response and a predefined verified prompt-response pair of the plurality of predefined verified prompt-response pairs:

providing the corresponding response from the target generative AI model to a source of the prompt; and managing feedback applied to the target generative AI model.

2. The computer-implemented method of claim 1, further comprising:

in response to providing the corresponding response from the target generative AI model to the source of the prompt, processing feedback concerning the corresponding response;

comparing the prompt and the corresponding response from the generative AI model to the plurality of predefined verified prompt-response pairs; and in response to determining, based on the vector similarity search, at least a threshold similarity between the prompt and the corresponding response and the predefined verified prompt-response pair, applying the feedback to the target generative AI model.

3. The computer-implemented method of claim 2, further comprising: in response to determining, based on the vector similarity search, at least the threshold similarity between the correspond response and the prompt and the predefined verified prompt-response pair from the plurality of predefined verified prompt-response pairs, preventing negative feedback from being applied to the target generative AI model.

4. The computer-implemented method of claim 1, wherein performing a vector similarity search comprises:

performing a first vector similarity search for the prompt with respect to embeddings generated for each prompt included in the plurality of predefined verified prompt-response pairs;

identifying a threshold number of most similar prompts from the plurality of predefined verified prompt-response pairs;

obtaining the corresponding responses for the threshold number of most similar prompts from the plurality of predefined verified prompt-response pairs;

generating embeddings representative of each corresponding response for the threshold number of most similar prompts; and performing a second vector similarity search for the corresponding response with respect to the corresponding responses from the plurality of predefined verified prompt-response pairs.

5. The computer-implemented method of claim 1, further comprising:

in response to determining, based on the vector similarity search, less than at least the threshold similarity between the prompt and the corresponding response and any of the plurality of predefined verified prompt-response pairs, providing a default response from the target generative AI model.

6. The computer-implemented method of claim 1, further comprising:

in response to determining, based on the vector similarity search, less than at least the threshold similarity between the prompt and the corresponding response and any of the plurality of predefined verified prompt-response pairs, providing a most similar predefined verified response from the plurality of predefined verified prompt-response pairs.

7. The computer-implemented method of claim 1, further comprising:

generating the plurality of predefined verified prompt-response pairs by:

extracting each paragraph of content from a verified document;

generating a prompt for each extracted paragraph; and generating a corresponding response to each prompt by processing the prompt and a corresponding extracted paragraph.

8. A computing system comprising:

a memory; and a processor configured to:

generate a first embedding representing a prompt directed to a target generative artificial intelligence (AI) model and a second embedding representing a corresponding response generated by the target generative AI model based on the prompt;

perform a vector similarity search on the first embedding and the second embedding with respect to embeddings representing prompts and responses of a plurality of predefined verified prompt-response pairs; and in response to determining, based on the vector similarity search, at least a threshold similarity between the response and the prompt and a predefined verified prompt-response pair from a plurality of predefined verified prompt-response pairs of the plurality of predefined verified prompt-response pairs:

provide the corresponding response form the target generative AI model to a source of the prompt; and manage feedback applied to the target generative AI model.

9. The computing system of claim 8, wherein the processor is further configured to:

in response to determining, based on the vector similarity search, at least the threshold similarity between the response and the prompt and the predefined verified prompt-response pair from the plurality of predefined verified prompt-response pairs, prevent negative feedback from being applied to the generative AI model.

10. The computing system of claim 9, wherein the processor is further configured to: in response to determining, based on the vector similarity search, less than at least the threshold similarity between the prompt and the corresponding response and any of the plurality of predefined verified prompt-response pairs, providing a default response from the target generative AI model.

11. The computing system of claim 8, wherein to perform the vector similarity search, the processor is further configured to:

perform a first vector similarity search for the prompt with respect to embeddings generated for each prompt included in the plurality of predefined verified prompt-response pairs;

identify a threshold number of most similar prompts from the plurality of predefined verified prompt-response pairs;

obtain the corresponding responses for the threshold number of most similar prompts from the plurality of predefined verified prompt-response pairs;

generate embeddings representative of each corresponding response for the threshold number of most similar prompts; and perform a second vector similarity search for the corresponding responses from the plurality of predefined verified prompt-response pairs using the embeddings representative of the prompt.

12. The computing system of claim 8, wherein the processor is further configured to:

in response to determining, based on the vector similarity search, less than at least the threshold similarity between the prompt and the corresponding response and any of the plurality of predefined verified prompt-response pairs, prevent positive feedback from being applied to the generative AI model.

13. The computing system of claim 8, wherein the processor is further configured to:

in response to determining, based on the vector similarity search, less than at least the threshold similarity between the prompt and the corresponding response and any of the plurality of predefined verified prompt-response pairs, apply negative feedback to the target generative AI model.

14. A computer program product residing on a non-transitory computer readable medium having a plurality of instructions stored thereon which, when executed by a processor, cause the processor to:

generate a first embedding representing a prompt directed to a target generative artificial intelligence (AI) model and a second embedding representing a corresponding response generated by the target generative AI model based on the prompt;

perform a vector similarity search on the first embedding and the second embedding with respect to embeddings representing prompts and responses of a plurality of predefined verified prompt-response pairs; and in response to determining, based on the vector similarity search, at least a threshold similarity between the prompt and the corresponding response and a predefined verified prompt-response pair of the plurality of predefined verified prompt-response pairs:

provide the corresponding response from the target generative AI model to a source of the prompt; and manage feedback applied to the target generative AI model.

15. The computer program product of claim 14, wherein to perform the vector similarity search, the processor is further configured to:

perform a first vector similarity search for the prompt with respect to embeddings generated for each prompt included in the plurality of predefined verified prompt-response pairs;

identify a threshold number of most similar prompts from the plurality of predefined verified prompt-response pairs;

obtain the corresponding responses for the threshold number of most similar prompts from the plurality of predefined verified prompt-response pairs;

generate embeddings representative of each corresponding response for the threshold number of most similar prompts; and perform a second vector similarity search for the corresponding response with respect to the corresponding responses from the plurality of predefined verified prompt-response pairs.

16. The computer program product of claim 14, wherein the processor is further to:

generate the plurality of predefined verified prompt-response pairs by:

extracting each paragraph of content from a verified document;

generating a prompt for each extracted paragraph; and generating a corresponding response to each prompt by processing the prompt and a corresponding extracted paragraph.

17. The computer program product of claim 14, wherein the processor is further to:

in response to determining, based on the vector similarity search, less than at least the threshold similarity between the prompt and the corresponding response and any of the plurality of predefined verified prompt-response pairs, provide a most similar predefined verified response from the plurality of predefined verified prompt-response pairs.

18. The computer program product of claim 14, wherein the processor is further to:

receive feedback associated with the corresponding response;

determine whether the feedback is one of positive and negative; and apply the feedback to the target generative AI model based on results of the vector similarly search and whether the feedback is positive or negative.

19. The computer program product of claim 18, wherein the processor is further to:

in response to determining, based on the vector similarity search, less than at least the threshold similarity between the prompt and the corresponding response and any of the plurality of predefined verified prompt-response pairs:

mark positive feedback as a false positive; and mark negative feedback as a false negative.

* * * * *